United States Patent
Nanjaiah (10) Patent No.: US 9,781,767 B2
(45) Date of Patent: Oct. 3, 2017

(54) METHOD FOR ACHIEVING FAST DORMANCY OF USER EQUIPMENT (UE) IN CELL_PCH OR URA_PCH STATE IN UMTS

(71) Applicant: Samsung Electronics Co. Ltd., Suwon-si, Gyeonggi-do (KR)

(72) Inventor: Shivaprasad Masanapura Nanjaiah, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 72 days.

(21) Appl. No.: 13/947,499

(22) Filed: Jul. 22, 2013

(65) Prior Publication Data

US 2014/0057639 A1    Feb. 27, 2014

(30) Foreign Application Priority Data

Aug. 24, 2012 (IN) .......................... 3484/CHE/2012

(51) Int. Cl.
*H04W 72/02* (2009.01)
*H04W 76/06* (2009.01)
*H04W 52/02* (2009.01)
*H04W 76/04* (2009.01)

(52) U.S. Cl.
CPC ....... *H04W 76/06* (2013.01); *H04W 52/0216* (2013.01); *H04W 76/068* (2013.01); *H04W 76/046* (2013.01); *Y02B 60/50* (2013.01)

(58) Field of Classification Search
CPC ............. H04W 76/046; H04W 76/068; H04W 52/029

USPC .................................. 455/574; 370/311, 331
See application file for complete search history.

(56) References Cited

U.S. PATENT DOCUMENTS

| | | | |
|---|---|---|---|
| 8,743,763 B2 * | 6/2014 | Patil .................... | H04W 76/068 370/311 |
| 2011/0038347 A1 | 2/2011 | Patil et al. | |
| 2011/0222451 A1 | 9/2011 | Peisa et al. | |

(Continued)

FOREIGN PATENT DOCUMENTS

WO    2011/060998 A1    5/2011

OTHER PUBLICATIONS

Blogging, Fast Dormancy in Release-8, Oct. 20, 2010, http://blog.3g4g.co.uk/2010/10/fast-dormancy-in-release-8.html.*

(Continued)

*Primary Examiner* — Nathan Mitchell
*Assistant Examiner* — Majid Syed
(74) *Attorney, Agent, or Firm* — Jefferson IP Law, LLP (57) ABSTRACT

A method and a system which enables a User Equipment (UE) in a Universal Mobile Telecommunications System (UTMS) to achieve fast dormancy in least possible time are provided. The method reduces the signalling burden on UE and Universal Terrestrial Radio Access Network (UTRAN) by eliminating the need of SCRI procedure by introducing cause value as 'end of user data' in Cell update cause Information element which can be used in cell update message in a Paging Channel (Cell_PCH) state and a UTRAN registration area (URA_PCH) states indicated to the network. The method reduces the time and signalling to transition the UE to an idle mode time and the method is energy efficient.

16 Claims, 4 Drawing Sheets

(56) References Cited

U.S. PATENT DOCUMENTS

| | | | | |
|---|---|---|---|---|
| 2012/0281561 | A1* | 11/2012 | Shukla | H04W 76/068 370/252 |
| 2013/0336285 | A1* | 12/2013 | Edara et al. | 370/331 |
| 2014/0051454 | A1* | 2/2014 | Wirtanen | H04W 76/046 455/452.1 |
| 2014/0220981 | A1* | 8/2014 | Jheng | H04W 76/045 455/437 |

OTHER PUBLICATIONS

ETSI TS 125 331 V10.4.0. (Jul. 2011) Universal Mobile Telecommunication System (UMTS) Radio Resource Control (RRC) Protocol Specification (3GPP TS 25.331 version 10.4.0. Release 10).*

\* cited by examiner

(RELATED ART)

METHOD FOR ACHIEVING FAST DORMANCY OF USER EQUIPMENT (UE) IN CELL_PCH OR URA_PCH STATE IN UMTS

CROSS-REFERENCE TO RELATED APPLICATION(S)

This application claims the benefit under 35 U.S.C. §119(a) of an Indian patent application filed on Aug. 24, 2012 in the Indian Intellectual Property Office and assigned Serial No. 3484/CHE/2012, the entire disclosure of which is hereby incorporated by reference.

TECHNICAL FIELD

The present disclosure relates to achieve fast dormancy in User Equipment (UE). More particularly, the present disclosure relates to achieving fast dormancy when a UE is in a Cell_PCH or a URA_PCH states.

BACKGROUND

Universal Mobile Telecommunications System (UMTS) is a third generation mobile cellular technology for networks based on the Global system For Mobile (GSM) standard. The UMTS is developed by the 3$^{rd}$ Generation Partnership Project (3GPP). UMTS employs Wideband Code Division Multiple Access (W-CDMA) radio access technology to offer greater spectral efficiency and bandwidth to mobile network operators. UMTS specifies a complete network system covering the UMTS Radio Access Network (UTRAN), the core network (Mobile Application Part (MAP)), and the authentication of users via Subscriber Identity Module (SIM) cards.

The User Equipment (UE) in the UMTS air interface has several activity states such as, for example, a Dedicated Transport Channel (Cell_DCH) state, a Forward Access Channel (Cell_FACH) state, a Paging Channel (Cell_PCH) state, a UTRAN registration area (URA_PCH) state, and idle mode. In a Cell-DCH state, a dedicated physical channel is allocated to the UE in uplink and downlink transmission. In a Cell_FACH state, no dedicated physical channel is allocated to UE. The UE continuously monitors a FACH in the downlink transmission. The UE is assigned a default common or shared transport channel in the uplink that the UE can use anytime according to the access procedure for the corresponding transport channel. In the Cell_PCH state, no dedicated physical channel is allocated to the UE, and no uplink transmission is possible. The position of the UE is known by UTRAN on a cell level according to the cell in which the UE most recently performed a cell update procedure. In the URA_PCH state, no dedicated channel is allocated to the UE and no uplink transmission is possible. The location of the UE is known on a UTRAN registration area level according to the URA assigned to the UE during the last performed URA update procedure.

Power consumption is a major issue in the UE. The amount of the power consumption in the UE depends on the UE's current activity which further depends on the current state of the UE. In terms of Radio Resource Control (RRC) states, when the UE is in the Cell-DCH state, the UE consumes maximum power and the power consumption reduces as the UE transitions to the Cell_FACH state, the Cell_PCH state, the URA_PCH state, and an idle mode in the same order. The RRC protocol belongs to the UMTS Wideband Code Division Multiple Access (WCDMA) protocol stack and handles the control plane signalling of Layer 3 between the UE and the UTRAN. Whenever the UE completes data transfer or does not have any more User Packet Switch data (PS data) to transmit for certain duration of time, maintaining the UE in idle mode is advisable. The idle mode is the most efficient battery consumption state for the UE.

According to the related art, fast dormancy is the process which helps UE to reach the dormant state as early as possible. The final intention of fast dormancy is to transition the UE into idle mode as soon as possible. Fast dormancy applies only for Packet Switched (PS) data and does not apply for Circuit Switched (CS) data or when CS related Non Stratum Access (NAS) procedures are on-going where NAS is a functional layer in the UMTS wireless telecom protocol stack between a core network and UE. Methods according to the related art achieve fast dormancy, where UE sends the Signalling Connection Release Indication (SCRI) message with cause defined for fast dormancy according to specification 25.331 of 3GPP, to UTRAN to provide an indication of the UE's dormant state. As provided by 3GPP specification, transitioning the UE to idle mode is easier when the UE is in the Cell_DCH state or the Cell_FACH state as compared to the Cell_PCH state or the URA_PCH state. If the UE is in the Cell_PCH state or the URA_PCH state, methods according to the related art follow complicated procedures to achieve fast dormancy. These procedures have an overhead of signalling messages between UE and UTRAN. Further, such procedures require allocation, release of resources on UTRAN side and require configuration, release of resources, and channels on the UE side. Thus, the above steps result in more number of intermediate state transitions, more number of signaling message exchanges making the existing methods time and energy inefficient.

Due to above mentioned reasons, existing methods fail to achieve fast dormancy with reduced signalling between UE and UTRAN faster in case when UE is in the Cell_PCH state or the URA_PCH state.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system to achieve fast dormancy of User Equipment (UE) in a Paging Channel (Cell_PCH) state or UTRAN registration area (URA_PCH) state, and to enable the UE to enter idle mode in least possible time by sending a cause during cell update procedure which requests Universal Terrestrial Radio Access Network (UTRAN) to end a Packet Switched (PS) session.

Another aspect of the disclosure is to provide reduced signalling on UE and UTRAN during fast dormancy procedure and efficiently use UE battery power.

In accordance with an aspect of the present disclosure, a method for achieving fast dormancy of a UE in a Universal Mobile Telecommunications System (UMTS) is provided. The method includes requesting for the fast dormancy by the UE to a UMTS network, when the UE is in at least one of a Cell_PCH state and a URA_PCH state, sending, to the network, cell update message including a cause, receiving, by the UE, a Radio Resource Control (RRC) connection release from the network, sending, by the UE, a the RRC connection release complete message to the network after receiving the RRC connection release, and switching the UE to an idle mode after sending the RRC connection release complete message.

In accordance with an aspect of the present disclosure, a UE for achieving fast dormancy in a UMTS is provided. The UE is configured with an integrated circuit further includes at least one processor, at least one memory storing a computer program code, the at least one memory and the computer program code configured with the at least one processor to cause the device to request for the fast dormancy by the UE to a network in the UMTS, when the UE is in at least one of a Cell_PCH state and a URA_PCH state, send, to the network, a cell update message including a cause, receive an RRC connection release from the network, send a RRC connection release complete message to the network after receiving the RRC connection release, and switch the UE to an idle mode after sending the RRC connection release complete message.

In accordance with an aspect of the present disclosure, a network for enabling a UE to achieve fast dormancy in a UMTS is provided. The network is configured to receive a cell update message including a cause from the UE, send an RRC connection release to the UE after receiving the cell update message including the cause, and receive an RRC connection release complete message from the UE after sending the RRC connection release to the UE.

Other aspects, advantages, and salient features of the disclosure will become apparent to those skilled in the art from the following detailed description, which, taken in conjunction with the annexed drawings discloses exemplary embodiments of the disclosure.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The exemplary embodiments of the present disclosure herein achieve a method and a system which provides fast dormancy of User Equipment (UE) in a Paging Channel (Cell_PCH) state or a Universal Terrestrial Radio Access Network (UTRAN) registration area (URA_PCH) state, and enables the UE to enter idle mode in least possible time and also by using least possible number of signalling messages exchanged between the UE and the UTRAN. According to exemplary embodiments of the present disclosure, the method initiates fast dormancy by sending the cause 'end of user data' during the cell update procedure. According to exemplary embodiments of the present disclosure, the method adds a new cause value 'end of user data' in the cell-update cause 10.3.3.3 Information Element of 3GPP specification 25.331 thereby reducing (e.g., eliminating) the need for sending a Signalling Connection Release Indication (SCRI) message in such scenarios. This reduces the signalling overhead for the UE and the UTRAN, as well as reduces time taken by the UE to transition into fast dormancy. Thus reduction in signalling messages and time enables an efficient utilization of battery power by the UE.

Referring now to the drawings, and more particularly to FIGS. 1 through 4, where similar reference characters denote corresponding features consistently throughout the figures, there are shown exemplary embodiments of the present disclosure.

Figure 1:
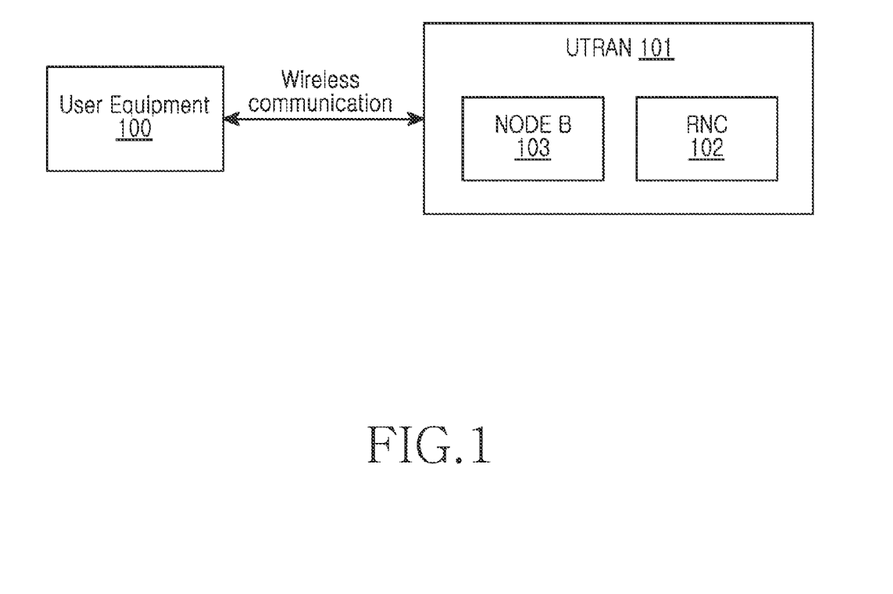
FIG. 1 illustrates a general block diagram of communication between a User Equipment (UE) and a Universal Terrestrial Radio Access Network (UTRAN) according to an exemplary embodiment of the present disclosure.

FIG. 1 illustrates a general block diagram of communication between UE and UTRAN according to an exemplary embodiment of the present disclosure.

Referring to FIG. 1, a UE 100 and a UTRAN 101 are provided. The UTRAN 101 includes a Radio Network Controller (RNC) 102 and a Node B 103. The UE 100 is connected to the UTRAN 101 through a wireless communication network. In Universal Mobile Telecommunications System (UMTS) and 3GPP Long Term Evolution (LTE), the UE 100 is any device used directly by an end-user to communicate.

According to exemplary embodiments of the present disclosure, the UE 100 can be a hand-held telephone, a laptop computer, a tablet, Personal Digital Assistant (PDA), a handheld e-book, a Portable/Personal Multimedia Player (PMP), a digital camera, a portable game console, or the like.

The UTRAN 101 is a communication network comprising RNC 102 and Node B 103, referred as 3rd Generation Wireless Mobile Communication Technology and can carry many traffic types from real-time Circuit Switched (CS) to Internet Protocol (IP) based Packet Switched (PS). The UTRAN 101 allows connectivity between the UE 100 and a Core Network (CN), and includes the Node B 103, and RNC 102. The RNC 102 provides control functionalities for one or more Node B 103 and the logical interface between the RNC and the one or more Node B 103 is known as the Iub. The RNC 102 and the corresponding Node B 103 are referred to as the Radio Network Subsystem (RNS). There are four interfaces connecting the UTRAN 101 internally or externally to other functional entities—Iu, Uu, Iub, and Iur. The Iu interface is an external interface that connects the RNC to the Core Network (CN). The Uu is an external interface that connects the Node B 103 with the UE 100. The Iub is an internal interface that connects the RNC 102 with the Node B 103. The Iur interface is generally an internal interface that connects two RNCs with each other.

Figure 2:
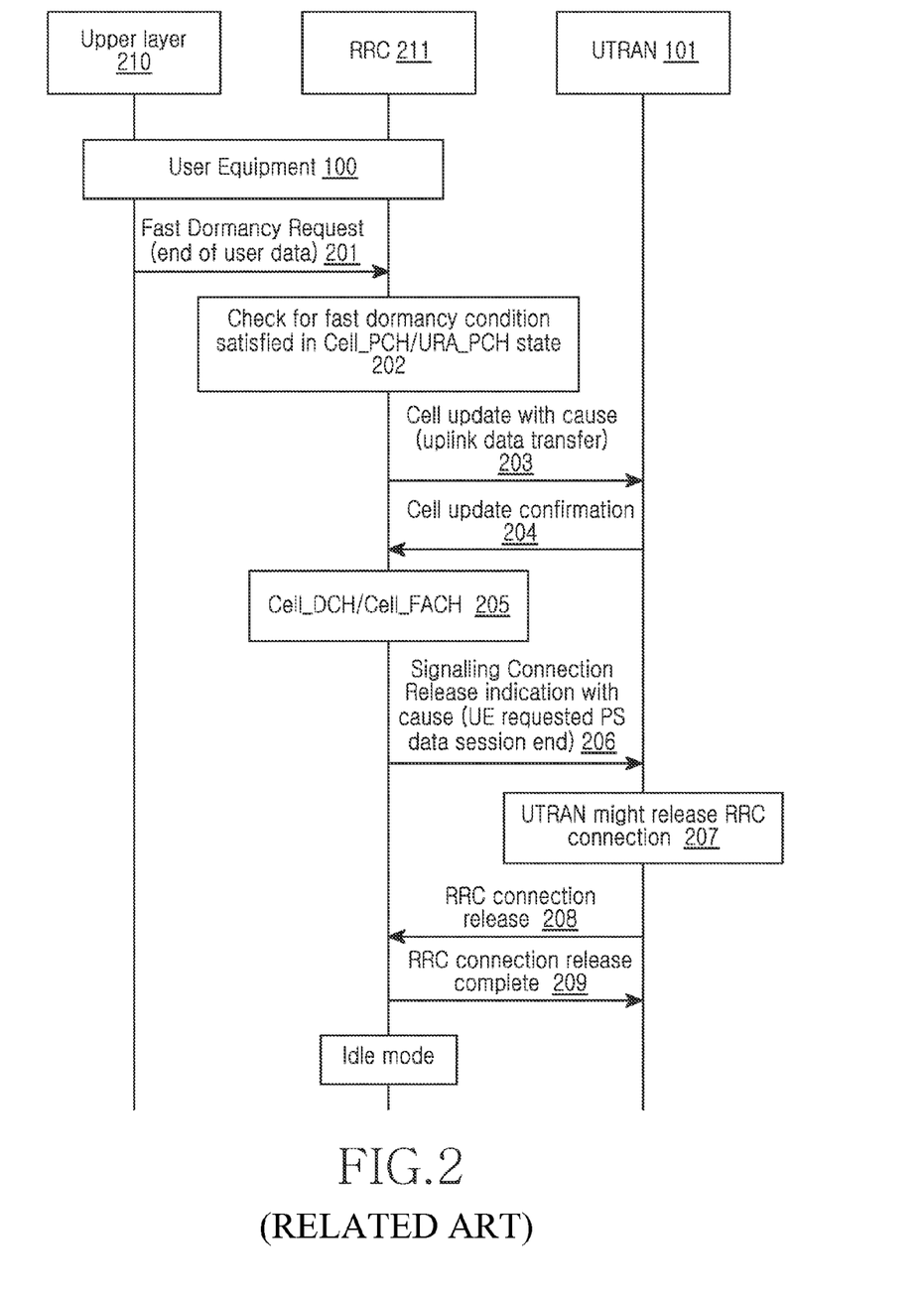
FIG. 2 illustrates a sequence diagram explaining a method of achieving fast dormancy when a UE is in a Paging Channel (Cell_PCH) or UTRAN registration area (URA_PCH) state according to the related art.

FIG. 2 illustrates a sequence diagram explaining a method of achieving fast dormancy when a UE is in a Cell_PCH state or a URA_PCH state according to the related art.

Referring to FIG. 2, an upper layer 210, a Radio Resource Control (RRC) 211 in a UE 100 and a UTRAN 101 are provided. The upper layer 210 is the application layer of the UE 100. The upper layer 210 detects gaps in data transfers using predefined timers (implementation dependent), detects inactivity of UE 100, and the like. If the UE 100 is in either of the Cell_PCH state or the URA_PCH state, and the READY_FOR_COMMON_EDCH variable, the HSPA_RNTI_STORED_CELL_PCH variable are not TRUE, and variables dedicated H_RNTI, C_RNTI are not set in RRC or not configured with information in the UE by NW, then in operation 201, the upper layer 210 in UE 100 detects data inactivity and requests the RRC 211 to initiate fast dormancy by informing about end of user data or user inactivity for prolonged time. For example, UE 100 can detect end of user data when the user closes an application in the UE 100. Similarly, the UE 100 can detect inactivity if the user is busy reading a downloaded email.

In operation 202, the RRC 211 which is a protocol layer handling signalling between the UE 100 and the UTRAN 101 checks for (e.g., determines) fast dormancy transition requirements/conditions in Cell_PCH/URA_PCH state. For example, the RRC 211 determines whether fast dormancy requirements/conditions are satisfied in the Cell_PCH state or the URA_PCH state.

The fast dormancy requirements/conditions indicates that fast dormancy is applied when (e.g., only when) the UE 100 has a PS user data session established and not when either of the CS Call or CS related signalling message are ongoing. When these conditions are met along with "UE Requested PS Data session ends" or if "No more PS User Data available to send for certain predefined duration", then the RRC 211 of the UE 100 can send the fast dormancy request to UTRAN 101 to transition the UE 100 to idle mode through a SCRI message.

If the UE is in either of Dedicated Transport Channel (Cell_DCH) state or a Forward Access Channel (Cell_FACH) state, and if Dedicated Control Channel (DCCH) in UTMS is configured or available, then the RRC 211 can send the SCRI message with the cause as defined in the 3GPP specification (e.g., 25.331) to request the UTRAN 101 to change the UE 100 to the idle state.

If the UE 100 is in Cell_PCH state or the URA_PCH state, and if the DCCH is configured or available High Speed Downlink Shared Channel (HS-DSCH) Radio Network Transaction Identifier (H-RNTI) and Cell Radio Network Temporary Identifier (C-RNTI) are available in the UE 100, the RRC 211 can still send the SCRI message on DCCH with the cause as defined in the specification (e.g., 25.331) to request the UTRAN 101 to change the UE 100 to the idle state.

The DCCH availability on Cell_PCH or URA_PCH depends on the 3GPP release complaint and the support for the same in the UE 100 implementation and in the network. If the UE is not supporting the Enhanced Cell FACH, or if the Enhanced Cell FACH is supported but not is configured by UTRAN 101 at that instant, then DCCH will not be available for the UE 100 to transmit anything in uplink (UL) when the UE 100 is in the Cell_PCH state or the URA_PCH state.

If fast dormancy requirements/conditions in operation 202 are satisfied and the UE is in the Cell_PCH state or the URA_PCH state, then the method proceeds to operation 203 in which the RRC 211 initiates the fast dormancy procedure and sends 203 an cell update message accompanied by cell update cause set as "uplink data transfer" to the UTRAN 101 as defined in the 3GPP specifications (e.g., 25.331). Table 1 provided below provides the details of the cell update cause information element as defined in the 3GPP specifications (e.g., 25.331).

Table 1 below indicates 10.3.3.3 Cell update cause Information element.

TABLE 1

| Information Element/ Group name | Need | Multi | Type and reference | Semantics description | Version |
|---|---|---|---|---|---|
| Cell update cause | MP | | Enumerated (cell reselection, periodical cell update, uplink data transmission, paging response, re-entered service area, radio link failure, RLC unrecoverable error, MBMS reception, MBMS ptp RB request | One spare value is needed. | REL-6 |

The UTRAN 101 on receiving the cell update message accompanied by cell update cause realizes that the UE 100 requires a cell update procedure for uplink data transfer. Moreover, in the method according to the related art, the UE is forced to send a cause value information element set as uplink data transmission in the cell update message which contradicts the intention of the UE 100 to transition to fast dormancy, as the existing 3GPP specification (e.g., 25.331) does not provide any cause to indicate fast dormancy request in cell update message.

In operation 204, the UTRAN 101 sends cell update confirm with the UE 100 state transition to DCH or FACH so that the UE 100 can send the data in UL.

Upon receiving the signal from the UTRAN 101, in operation 205, the RRC 211 shifts the UE 100 to the Cell_DCH state or the Cell_FACH state according to the instruction given by the UTRAN 101 in cell update confirm message.

Thereafter, in operation 206, the RRC 211 further initiates the SCRI message with cause 'UE requested PS data session end' to inform the UTRAN 101 about the intention of the UE 100 to enter a dormant state. In the method of fast dormancy process of the UE 100 according to the related art, the process of reentering active state consumes high power contradicting the desired intention of UE 100.

Thereafter, in operation 207, the UTRAN 101 might release 207 the RRC Connection. A fast dormancy request need not always be honored by the UTRAN 101. Therefore, the UTRAN 101 may act on the request by sending any corresponding message on the downlink or might not act on the received SCRI message.

The section 8.1.14 Signalling connection release indication procedure as per 3GPP specification 25.331-a50 is given below:

8.1.14.1 General

The signalling connection release indication procedure is used by the UE to indicate to the UTRAN that one of its signalling connections has been released or it is used by the UE to request UTRAN to initiate a state transition to a battery efficient RRC state. The procedure may in turn initiate the RRC connection release procedure.

8.1.14.2 Initiation

The UE shall, on receiving a request to release (abort) the signalling connection from upper layers for a specific CN domain:

1> if a signalling connection in the variable ESTABLISHED_SIGNALLING_CONNECTIONS for the specific CN domain identified with the IE "CN domain identity" exists:

2> initiate the signalling connection release indication procedure.

1> otherwise:

2> abort any ongoing establishment of signalling connection for that specific CN domain as specified in 8.1.3.5a.

Upon initiation of the signalling connection release indication procedure in CELL_PCH or URA_PCH state, the UE shall:

1> if variable READY_FOR_COMMON_EDCH is set to TRUE:

2>move to CELL_FACH state and continue with the signalling connection release indication procedure as below.

1> else:

2>if variable HSPA_RNTI_STORED_CELL_PCH is set to TRUE:

3>move to CELL_FACH state and continue with the signalling connection release indication procedure as below.

2>else:

3>if variable H_RNTI and variable C_RNTI are set:

4>continue with the signalling connection release indication procedure as below.

3> else:

4>perform a cell update procedure, according to sub clause 8.3.1, using the cause "uplink data transmission";

4>when the cell update procedure completed successfully:

5>continue with the signalling connection release indication procedure as below.

The UE shall:

1>set the IE "CN Domain Identity" to the value indicated by the upper layers. The value of the IE indicates the CN domain whose associated signalling connection the upper layers are indicating to be released;

1>if the UE includes the IE "Signalling Connection Release Indication Cause" and does not set it to "UE Requested PS Data session end";

2>set the IE "Signalling Connection Release Indication Cause" to "any other cause";

1> transmit a SIGNALLING CONNECTION RELEASE INDICATION message on DCCH using AM RLC.

1> if the SIGNALLING CONNECTION RELEASE INDICATION message did not include the IE "Signalling Connection Release Indication Cause" set to "UE Requested PS Data session end".

2>remove the signalling connection with the identity indicated by upper layers from the variable ESTABLISHED_SIGNALLING_CONNECTIONS. When the successful delivery of the SIGNALLING CONNECTION RELEASE INDICATION message has been confirmed by RLC the procedure ends.

In addition, if the timer T323 value is stored in the IE "UE Timers and constants in connected mode" in the variable TIMERS_AND_CONSTANTS, and if there is no CS domain connection indicated in the variable ESTABLISHED_SIGNALLING_CONNECTIONS, the UE may:

1> if the upper layers indicate that there is no more PS data for a prolonged period:

2>if timer T323 is not running:

3>if the UE is in CELL_DCH state or CELL_FACH state; or

3>if the UE is in CELL_PCH state or URA_PCH state and the DRX cycle length in use is shorter than the shorter CN domain specific DRX cycle length for the PS domain and CS domain; or 3>if the UE is in CELL_PCH state or URA_PCH state and the DRX cycle length in use is equal to or longer than the shorter CN domain specific DRX cycle length for the PS domain and CS domain, and V316<1:

4>if the UE is in CELL_PCH state or URA_PCH state and the DRX cycle length in use is equal to or longer than the shorter CN domain specific DRX cycle length for the PS domain and CS domain:

5>increment V316 by 1.

4> set the IE "CN Domain Identity" to PS domain;

4> set the IE "Signalling Connection Release Indication Cause" to "UE Requested PS Data session end";

4> transmit a SIGNALLING CONNECTION RELEASE INDICATION message on DCCH using AM RLC;

4> start the timer T323;

3> the procedure ends.

In operation 208, if UTRAN 101 acts on the SCRI message request, the UTRAN 101 may send a RRC Connection Release Message to the UE 100.

Thereafter, in operation 209, the RRC 211 in UE after releasing the connection, sends to the UTRAN 101 a RRC Connection Release Complete Message to confirm and finally shifts UE 100 to idle mode.

If the UTRAN 101 does not act and does not send any response then the UE 100 can only send another fast dormancy request after some time again as mentioned in the 3GPP specification (e.g., 25.331).

Figure 3:
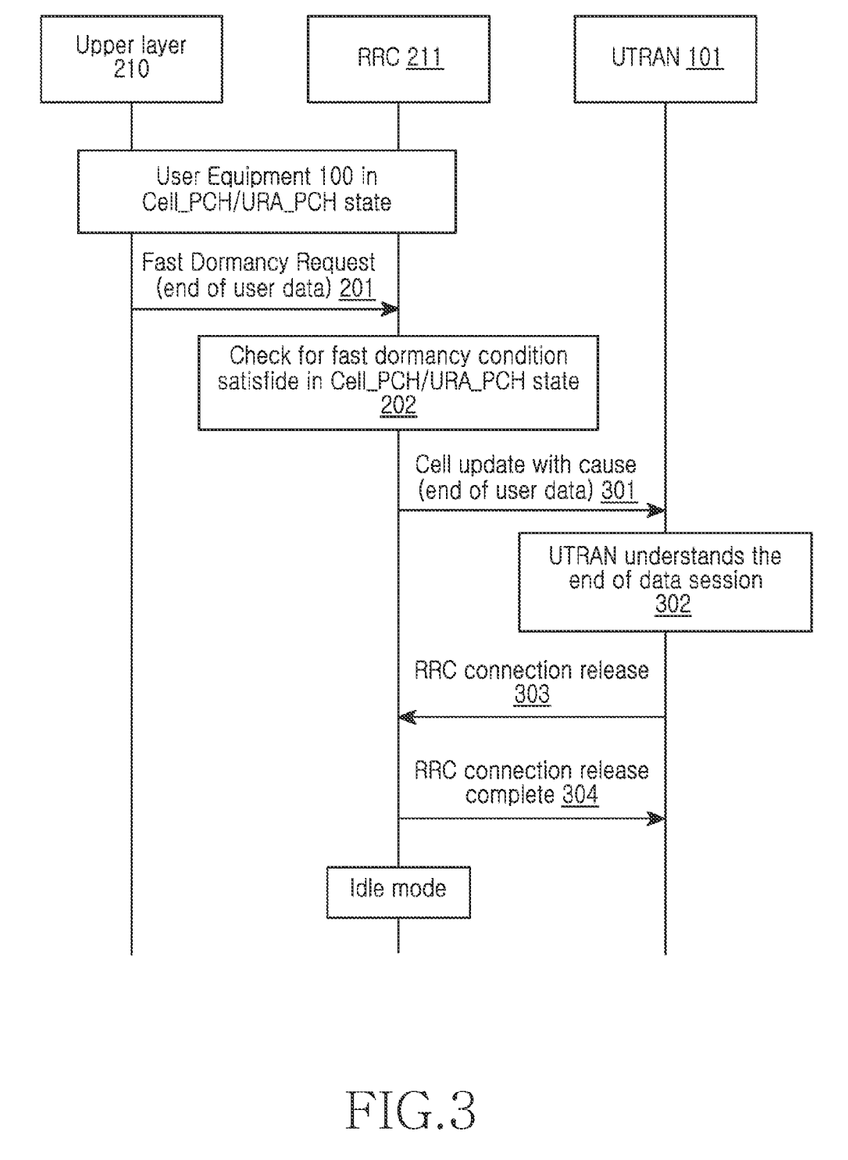
FIG. 3 illustrates a sequence diagram explaining a method of achieving fast dormancy when a UE is in Cell_PCH state or a URA_PCH state, according to an exemplary embodiment of the present disclosure.

FIG. 3 illustrates a sequence diagram explaining a method of achieving fast dormancy when a UE is in a Cell_PCH state or a URA_PCH state, according to an exemplary embodiment of the present disclosure.

Referring to FIG. 3, an upper layer 210, a RRC 211 in a UE 100, and a UTRAN 101 are provided. The upper layer 210 is the application layer of the UE 100 which detects gaps or pauses in data transfer using predefined timers, detects inactivity of the UE 100, and the like. If the UE 100 is in either of the Cell_PCH state or the URA_PCH state and the READY_FOR_COMMON_EDCH, HSPA_RNTI_STORED_CELL_PCH variables are not TRUE, and the H_RNTI C_RNTI variables are not set, then in operation 201, the upper layer 210 in UE 100 detects data inactivity, and requests the RRC 202 to initiate fast dormancy procedure by informing about end of user data or user inactivity for prolonged time. For example the UE 100 can detect end of user data when user closes an application on UE 100. Similarly the UE 100 can detect inactivity if the user pauses the data upload application.

In operation 202, the RRC 211, which is a protocol layer handling signalling between the UE 100 and the UTRAN 101, checks for fast dormancy requirements/conditions before initiating the fast dormancy procedure. As mentioned earlier in relation to methods according to the related art, if the UE 100 does not support the Enhanced Cell FACH, or if the Enhanced Cell FACH is supported but not is configured by the UTRAN 101 at that instant, then DCCH will not be available for the UE 100 to transmit in UL when the UE 100 is in the Cell_PCH state or the URA_PCH state. According to exemplary embodiments of the present disclosure, the method provides an advantage over methods according to the related art as in all cases such as when the Enhanced Cell FACH is not supported by the UE 100 or if the UE 100 is not configured (e.g., HRNTI, CRNTI are not available) by the UTRAN 101 at that instant, then UE 100 can use the method according to exemplary embodiments of the present disclosure so as to make faster transition to idle mode.

In operation 301, the RRC 211 on satisfying the fast dormancy requirements/conditions now initiates fast dormancy procedure and sends a Cell update message with a cell update cause value set as 'end of user data' set in the Information Element "Cell update cause" to the UTRAN 101.

In operation 302, the UTRAN 101 understands that the cell update message is an indication of an end of user data session and that the UE 100 is in the Cell_PCH state or the URA_PCH state.

Thereafter, in operation 303 the UTRAN 101 sends an RRC Connection Release to transition the UE 100 to idle mode immediately.

In operation 304, the UE sends to the UTRAN 101 a RRC Connection Release Complete as confirmation and shifts the UE 100 to idle mode after receiving the RRC Connection Release message. According to exemplary embodiments of the present disclosure, such a method avoids unnecessary transition of the UE 100 to the Cell_DCH state or the Cell_FACH state before transitioning to idle mode. The UTRAN 101 can further trigger release of an Iu connection for the UE 100, towards Core Network (CN).

According to exemplary embodiments of the present disclosure, the method reduces unnecessary signalling between the UE 100 and the UTRAN 101 by eliminating SCRI procedure as in the method according to the related art.

Table 2 below indicates 10.3.3.3 Cell update cause Information Element with proposed cause.

TABLE 2

| Information Element/ Group name | Need | Multi | Type and reference | Semantics description | Version |
|---|---|---|---|---|---|
| Cell update cause | MP | | Enumerated (cell reselection, periodical cell update, uplink data transmission, paging response, re-entered service area, radio link failure, RLC unrecoverable error, MBMS reception, MBMS ptp RB request, end of user data | One spare value is needed. | REL-6 |

Figure 4:
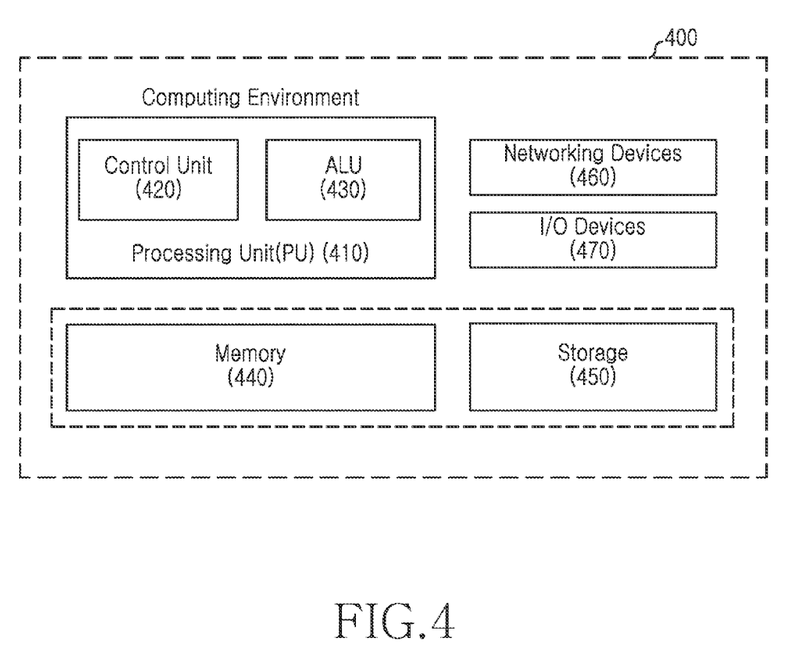
FIG. 4 illustrates a computing environment implementing an application, according to an exemplary embodiment of the present disclosure.

FIG. 4 illustrates a computing environment implementing an application, according to an exemplary embodiment of the present disclosure.

Referring to FIG. 4, the computing environment 400 comprises at least one processing unit 410 that is equipped with a control unit 420 and an Arithmetic Logic Unit (ALU) 430, a memory 440, a storage unit 450, at least one networking device 460, and at least one Input/Output (I/O) device 470.

The processing unit 410 is responsible for processing the instructions of the algorithm. The processing unit 410 receives commands from the control unit 420 in order to perform its processing. Further, any logical and arithmetic operations involved in the execution of the instructions are computed with the help of the ALU 430.

The overall computing environment 400 can be composed of multiple homogeneous and/or heterogeneous cores, multiple Central Processing Units (CPUs) of different kinds, special media, and other accelerators. The processing unit 410 is responsible for processing the instructions of the algorithm. The processing unit 410 receives commands from the control unit 420 in order to perform its processing. Further, any logical and arithmetic operations involved in the execution of the instructions are computed with the help of the ALU 430. Further, the processing unit may include a plurality of process units which may be located on a single chip or over multiple chips.

The algorithm including instructions and codes required for the implementation are stored in either the memory unit 440, the storage unit 450, or both the memory unit 440 and the storage unit 450. At the time of execution, the instructions may be fetched from the corresponding memory and/or storage, and executed by the processing unit 410.

In case of any hardware implementations various networking devices or external I/O devices may be connected to the computing environment 400 to support the implementation through the networking unit 460 and the I/O device unit 470.

Exemplary embodiments of the present disclosure disclosed herein can be implemented through at least one software program running on at least one hardware device and performing network management functions to control the elements. The elements shown in FIGS. 1 to 4 include blocks which can be at least one of a hardware device, a software, or a combination of hardware device and software module.

For example, such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for operating a user equipment (UE), the method comprising:
   if a condition for performing a fast dormancy is satisfied, transmitting, to a base station, a first cell update message comprising an information element (IE) indicating termination of a data session for the UE;
   receiving, from the base station, a message for releasing a radio resource control (RRC) connection without transmitting a signaling connection release indication (SCRI) message; and
   switching from a state to an idle mode for which the RRC connection is released by receiving the message for RRC connection which is transmitted in response to the first cell update message,
   wherein the state is one of a cell paging channel (Cell_PCH) state and a universal terrestrial radio access network (UTRAN) registration area paging channel (URA_PCH) state.

2. The method of claim 1,
   wherein the state is switched to the idle mode without either going through a cell dedicated channel (DCH) state or a cell forward access channel (FACH) state by receiving the message for RRC connection which is transmitted in response to the reception of the first cell update message by the base station.

3. The method of claim 2, further comprising:
   if the condition is not satisfied, transmitting, to the base station, a second cell update message comprising a IE indicating one of cell reselection, periodical cell update, paging response, re-entered service area, radio link failure, radio link control (RLC) unrecoverable error, multimedia broadcast multicast service (MBMS) reception, and MBMS point-to-point (ptp) radio bearer (RB) request;
   receiving, from the base station, a cell update confirmation message which is transmitted in response to the second cell update message; and
   switching from the state to a second state which is one of a cell dedicated channel (DCH) state and a cell forward access channel (FACH) state.

4. The method of claim 1,
   wherein the first cell update message is transmitted on common control channel (CCCH) when the UE is in the state, and
   wherein the UE does not support an enhanced forward access channel (FACH) state or the UE is not configured by UTRAN if the enhanced cell FACH is supported.

5. An apparatus of user equipment (UE) comprising:
   at least one transceiver; and
   at least one processor operatively coupled to the at least one transceiver,
   wherein the at least one processor is configured to:
      if a condition for performing a fast dormancy is satisfied, transmit, to a base station, a cell update message comprising an information element (IE) indicating a termination of a data session for the UE,
      receive, from the base station, a message for releasing radio resource control (RRC) connection without transmitting a signaling connection release indication (SCRI) message, and
      switch from a state to an idle mode for which the RRC connection is released by receiving the message for RRC connection which is transmitted in response to the first cell update message,
   wherein the state is one of a cell paging channel (Cell_PCH) state and a universal terrestrial radio access network (UTRAN) registration area paging channel (URA_PCH) state.

6. The apparatus of claim 5, wherein the state is switched to the idle mode without either going through a cell dedicated channel (DCH) state or a cell forward access channel (FACH) state by receiving the message for RRC connection which is transmitted in response to the reception of the first cell update message by the base station.

7. The apparatus of claim 6, wherein the at least one processor is further configured to:
   if the condition is not satisfied, transmit, to the base station, a second cell update message comprising a IE indicating one of cell reselection, periodical cell update, paging response, re-entered service area, radio link failure, radio link control (RLC) unrecoverable error, multimedia broadcast multicast service (MBMS) reception, and MBMS point-to-point (ptp) radio bearer (RB) request;
   receive, from the base station, a cell update confirm message which is transmitted in response to the second cell update message; and
   switch from the state to a second state.

8. The apparatus of claim 5,
   wherein the first cell update message is transmitted on common control channel (CCCH) when the UE is in the state, and
   wherein the UE does not support an enhanced cell forward access channel (FACH) state or the UE is not configured by UTRAN if the enhanced cell FACH is supported.

9. An apparatus of a base station comprising:
   at least one transceiver; and
   at least one processor operatively coupled to the at least one transceiver,
   wherein the at least one processor is configured to:
      receive, from a user equipment (UE), a cell update message comprising an information element, and
      if the IE indicates a termination of a data session for the UE, transmit, to the UE, a message for releasing radio resource control (RRC) connection to switch from a state of the UE to an idle mode for which the RRC connection is released in response to receiving the cell update message without receiving a signaling connection release indication (SCRI) message,
   wherein the state is one of a cell paging channel (Cell_PCH) state and a universal terrestrial radio access network (UTRAN) registration area paging channel (URA_PCH) state.

10. The apparatus of claim 9,
    wherein the state is switched to the idle mode without either going through a cell dedicated channel (DCH) state or a cell forward access channel (FACH) state by receiving the message for RRC connection which is transmitted in response to the reception of the cell update message comprising the IE indicating the termination of the data session.

11. The apparatus of claim 10, wherein the at least one processor is further configured to:

if the IE indicates one of cell reselection, periodical cell update, uplink data transmission, paging response, re-entered service area, radio link failure, radio link control (RLC) unrecoverable error, multimedia broadcast multicast service (MBMS) reception, and MBMS point-to-point (ptp) radio bearer (RB) request, transmit a cell update confirmation message to the UE in response to receiving the cell update message to switch from the state of the UE to a second state which is one of a cell dedicated channel (DCH) state and a cell forward access channel (FACH) state.

12. The base station as in claim 9, wherein the cell update message is received on common control channel (CCCH), wherein the cell update message is transmitted when the UE is in the state, and wherein the UE does not support an enhanced forward access channel (FACH) state or the UE is not configured by UTRAN if the enhanced cell FACH is supported.

13. A method for operating a base station, the method comprising:

receiving, from of a user equipment (UE), a cell update message comprising an information element (IE); and if the UE indicates a termination of a data session for the UE, transmitting, to the UE, a message for releasing radio resource control (RRC) connection to switch from a state of the UE to an idle mode for which the RRC connection is released in response to receiving the cell update message without receiving a signaling connection release indication (SCRI) message, wherein the state is one of a cell paging channel (Cell_PCH) state and a universal terrestrial radio access network (UTRAN) registration area paging channel (URA_PCH) state.

14. The method of claim 13, wherein the state is switched to the idle mode without either going through a cell dedicated channel (DCH) state or a cell forward access channel (FACH) state by receiving the message for releasing RRC connection which is transmitted in response to the reception of the cell update message comprising the IE indicating the termination of the data session.

15. The method of claim 14, further comprising:

if the IE indicates one of cell reselection, periodical cell update, uplink data transmission, paging response, re-entered service area, radio link failure, radio link control (RLC) unrecoverable error, multimedia broadcast multicast service (MBMS) reception, and MBMS point-to-point (ptp) radio bearer (RB) request, transmitting a cell update confirmation message to the UE in response to receiving the cell update message to switch from the state of the UE to a second state which is one of a cell dedicated channel (DCH) state and a cell forward access channel (FACH) state.

16. The method of claim 13, wherein the cell update message is received on common control channel (CCCH), wherein the cell update message is transmitted when the UE is in the state, and wherein the UE does not support an enhanced cell forward access channel (FACH) state or the UE is not configured by UTRAN if the enhanced cell FACH is supported.

\* \* \* \* \*